United States Patent

[11] 3,631,526

[72] Inventor Donald C. Brunton
 Columbus, Ohio
[21] Appl. No. 874,358
[22] Filed Nov. 5, 1969
[45] Patented Dec. 28, 1971
[73] Assignee Brun Sensor Systems, Inc.
 Columbus, Ohio

[54] APPARATUS AND METHODS FOR ELIMINATING INTERFERENCE EFFECT ERRORS IN DUAL-BEAM INFRARED MEASUREMENTS
 18 Claims, 3 Drawing Figs.
[52] U.S. Cl. .................................................. 250/83.3 D,
 250/83.3 H
[51] Int. Cl. ........................................................ G01j 3/00
[50] Field of Search ............................................ 250/83.3 D,
 83.3 H

[56] References Cited
 UNITED STATES PATENTS
| | | | |
|---|---|---|---|
| 3,017,512 | 1/1962 | Wolbert | 250/83.3 D X |
| 3,043,956 | 7/1962 | Cohen | 250/83.3 IR |
| 3,405,270 | 10/1968 | Briggs | 250/83.3 D X |
| 3,426,201 | 2/1969 | Hilton et al. | 250/83.3 D |

Primary Examiner—Archie R. Borchelt
Attorney—Cennamo, Kremblas and Foster

ABSTRACT: Apparatus and method for eliminating interference effect errors in dual-beam infrared measurements of either a reflection or through-transmission type is provided through specific geometrical arrangements and beam configuration and through selection of the two beam wavelengths in a specific relationship. Aspects of interference phenomenon are utilized in both the geometrical arrangement or beam configuration and the wavelength selection techniques of eliminating interference effects in the measurement of a particular material property or parameter. These techniques are adapted to measurement of a radiation-transmissive material which may be formed as a self-supporting film or as a coating or film on a base material and wherein the surfaces of the layer of material are specular. One technique comprises causing the two beams of radiation to be incident to a surface of the film at a broad spectrum of angles such that components of the beams that subsequently exit the film and are reflected at the surfaces thereof will be added at all possible phase angles thereby eliminating the effects of phase displacement as to specific beam components. A second technique utilizes selection of two wavelengths sufficiently close together for the two beams so that, for a film which is relatively thin, the interference effect resulting from phase displacement of components of each beam will be minimal. The third technique forms each of the two beams of radiation to comprise a relatively broad spectral band rather than a substantially discrete wavelength with the consequent phase displacement of the beam components resulting in addition of the beam components at all possible phase angles. These three techniques may be utilized independently or either the second or third described technique may be utilized in combination with the first-described technique. Also, the techniques are equally applicable to reflection measurements where the radiation detector is disposed at the same side of the film as the radiation source or to through-transmission measurements where the detector is disposed at the opposite side of the film.

Details of some elements of structure are not incorporated in the foregoing description as these elements are well known in the prior art and the interference-error-eliminating techniques of this invention are fully disclosed. These techniques are applicable to either reflection or through-transmission measurements in effectively eliminating interference errors thereby providing more accurate results. Any of the described techniques may be utilized independently of the others or either the closely adjacent wavelength selection or the broad spectral band techniques may be utilized in combination with the wide-angle technique as may be deemed advisable in a specific application of the invention to optimize interference error elimination.

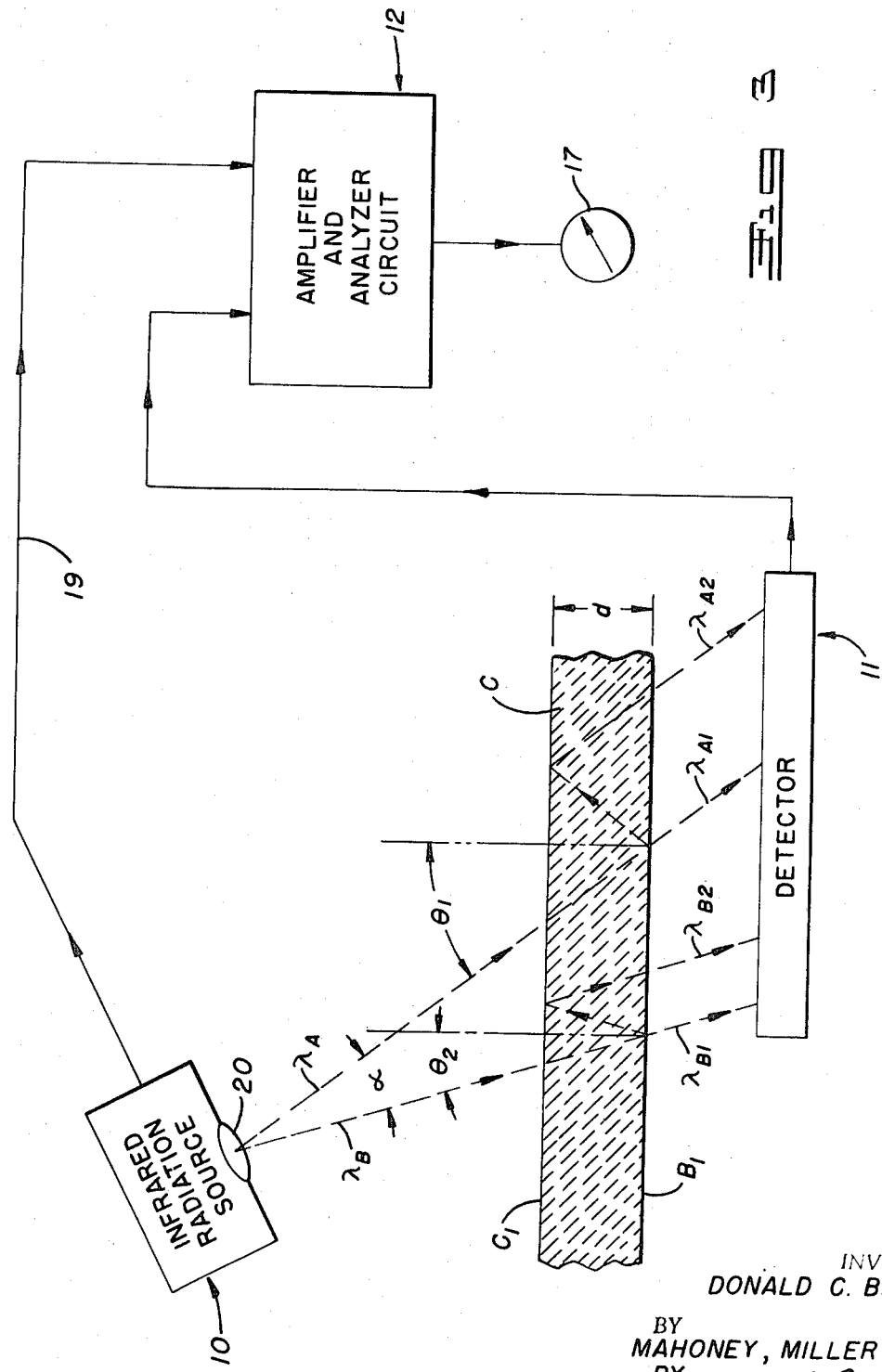

APPARATUS AND METHODS FOR ELIMINATING INTERFERENCE EFFECT ERRORS IN DUAL-BEAM INFRARED MEASUREMENTS

BACKGROUND OF THE INVENTION

The apparatus and methods of the invention were specifically developed for determining a property or parameter of a thin radiation-transmissive film of material that may be formed either as a self-supporting sheet or as a coating on a base sheet. As a specific example, a thin film of an organic material such as polyethylene may be formed on a relatively thick base sheet formed from paper or metal foil. A characteristic of the film with which the invention is concerned is that the film formed either as a self-supporting sheet or as a coating, has specular surfaces and will be strongly reflective of radiation incident to either a first surface or second surface, including a second surface which is the interface surface between the film and an underlying base sheet. Radiation incident to the film will be reflected at the first and second surfaces and, in the case of a reflection-type measurement, the reflected components subsequently detected by electrical radiation sensors connected in a circuit to provide an output signal or readout that is indicative of the particular parameter of interest. In the case of a through-transmission-type measurement, the radiation sensors would be positioned at the side of the film opposite the radiation source to detect radiation transmitted through the film.

A reflection-type, dual-beam infrared measurement technique is disclosed in U.S. Pat. No. 3,017,512 and diagrammatically illustrates the type of measurement to which the interference error elimination techniques of this invention may be advantageously applied to obtain more accurate results. A manufacturing process to which this type of measurement is particularly adaptable is the control of a parameter of a film which is applied to a moving web-form base sheet. For example, it may be necessary to precisely control the thickness of the film to obtain optimum coating characteristics or cost control and this requires continuous monitoring with an output signal providing either a visual output for manual control of the process or a signal that is directly inserted into the process control apparatus by a feedback circuit.

The problem which arises with either the reflection-type or through-transmission-type measurement with respect to a film having specular surfaces is that there will be both first and second surface reflections which occur at the opposite surfaces of a self-supporting film or, in the case of a coated base sheet, at the respective outer or exposed surface of the film and the opposite surface at the interface of the film and the base sheet. While the first and second surface reflections produce respective signal components, these reflection components for each specific wavelength suffer phase displacement and as a consequence of the interference phenomenon, result in an output signal which is a function of this phase displacement. With one of the beams of radiation of a wavelength selected to not exhibit a characteristic absorption with respect to either the film or a base sheet and the other wavelength selected to exhibit a characteristic absorption as to the film, it will be seen that variations in relative phase displacements of the reflected components will occur due to the interference phenomenon and produce corresponding variations in the detected signals with consequent error in the measurement.

BRIEF DESCRIPTION OF THE INVENTION

In the first aspect of this invention, each beam of radiation is directed in a wide-angle beam toward the surface of the film to be incident thereto at a relatively broad spectrum of angles rather than at a single specific angle of incidence as in the case of the prior art techniques. This angle of incidence spectrum is selected to be of such breadth that reflection components will be added at all possible phase angles for each beam of radiation and the effect of interference between first and second surface reflection components for each beam will be substantially eliminated and result in an error-free output signal. As a further refinement of this wide-angle technique for elimination of interference error and also as an independent technique for elimination of interference error, the reference and absorption wavelengths are selected to be sufficiently close together so that the relative phase displacement between the respective first and second surface reflection components will be minimal. A third aspect of the technique of this invention which may be utilized in combination with the wide-angle reflection technique or which may be utilized independently comprises the utilization of a relatively broad spectral band of wavelength for the reference and absorption radiation beams. Utilization of a sufficiently broad spectral band of wavelengths also results in addition of reflection components at all possible phase angles with consequent elimination of interference error.

These and other objects and advantages of the techniques of this invention for eliminating interference error will be readily apparent from the following detailed description and the accompanying drawings.

In the drawings:

FIG. 3 is a diagrammatic representation of a dual-beam, infrared through-transmission measurement apparatus illustrating the wide angle of incidence technique of interference error elimination.

Figure 1:
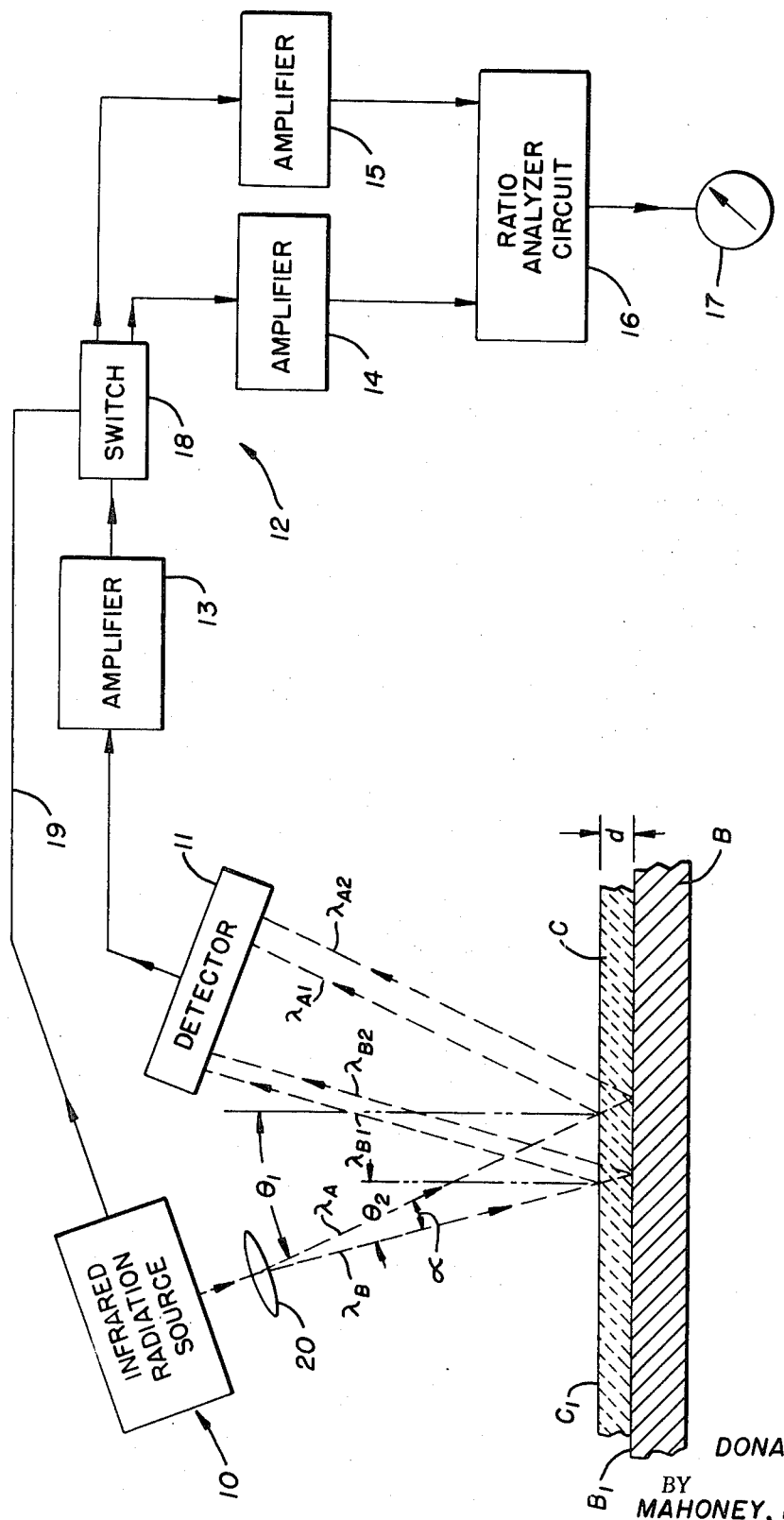
FIG. 1 is a diagrammatic representation of a dual-beam, infrared reflection measurement apparatus illustrating the utilization of the wide angle of incidence technique of interference error elimination.

Having specific reference to FIG. 1 of the drawings, a measurement apparatus of the dual-beam infrared radiation reflection measurement type and utilizing the interference elimination technique of this invention is diagrammatically illustrated with respect to a double layer sheet form material comprising a base sheet B and a film or coating C applied to a surface of the base sheet. In this illustrative example, it is assumed that the base sheet B and the coating C are an elongated, sheet form web which has been subjected to a process wherein the coating was applied to a surface of the base sheet. It is the objective of the apparatus and method of this inventive technique to determine a property of the coating C which, for example, may be the thickness $d$ of the coating. The ultimate objective of determination of a particular property of a coating, such as the thickness, is to permit utilization of this information in continuous control of the coating process and, as a specific example, effect control over the thickness of the coating as it is applied to the base sheet. It is also assumed in this illustrative example that the base sheet B is formed from a material which is generally opaque to the specific infrared radiation utilized and has a specular surface $B_1$ at the interface of the coating C. It is also assumed that the coating C is a material transmissive of the infrared radiation, an organic polyethylene material, for example, and which also has a specular outer surface $C_1$.

Apparatus for generating the necessary infrared radiation and subsequently detecting the reflected components of each of the infrared radiation beams is only diagrammatically illustrated in FIG. 1 as the several components comprise structures well known in the art and includes a dual-beam, infrared radiation source designated generally by the numeral 10, a radiation-responsive sensor 11 and a signal amplification and analysis circuit 12. The radiation source 10 is illustrated as being of the type which each is capable of generating two discrete beams of infrared radiation having the respective wavelengths $\lambda_1$ and $\lambda_2$ and subsequently directing the two beams of radiation toward the outer surface $C_1$ of the coating C. In this example, while the two beams of radiation are directed along the same path, they are not simultaneously transmitted, but are time spaced. However, the illustrated beam is representative of both beams for purposes of explanation of the optical interference phenomenon utilized to eliminate interference error effects. U.S. Pat. No. 3,089,382 is illustrative of the type of dual-beam infrared radiation generating apparatus which may be utilized for producing the two time-spaced beams of radiation for the reflective-type measurement technique such as is basically disclosed in the previously cited U.S. Pat. No. 3,017,512. In this type of apparatus, an infrared radiation source producing polychromatic radiation is arranged to direct the emitted radiation toward the subject under test and the radiation is caused to pass through filter elements which are alternatingly interposed in the path of the radiation to form the beams of radiation. These filter elements, which are of the band-pass type having a designed passband of a desired wavelength spectrum, are mechanically supported in the path of the radiation by means such as a revolving wheel to alternatingly produce two time-separated beams of monochromatic radiation. The wavelength of the designed passband for each filter element is determined by the specific coating material and the property or parameter of interest in a particular test arrangement to provide one beam (the absorption beam) of radiation of a wavelength selected to exhibit a characteristic resonance absorption with respect to the coating material while the other beam of radiation, which is considered as a reference beam, is of a selected wavelength that is either not affected by the property of the material or which exhibits a lesser degree of absorption than the absorption beam. Accordingly, the two beams of radiation are subject to differing effects as a consequence of reflection at the interface surface of the material due to absorption of one beam and this difference is detectable by an appropriate detection system to provide an output.

The radiation-responsive sensor 11 is disposed in predetermined angular configuration relative to the source 10 so that radiation components reflected from both the first or second surfaces of the coating ($C_1$ and $B_1$) will be incident to a radiation receptor surface of the sensor. Specific characteristics of the sensor 11 are determined by the particular radiation wavelengths utilized in a specific test arrangement and the sensor may be of the type known as a photovoltaic cell or it may be a photoresistive device. Either type of sensor includes terminals that are connected to an electronic amplifier circuit and the characteristics of the detector or sensor are utilized to form a signal at the output of the amplifier. This amplified output signal is subsequently fed to respective amplifier circuits that respond to signal components related to the two specific radiation beams. An output signal from each amplifier circuit 14 and 15 is then fed into a ratio analyzer circuit 16 and the output of the ratio circuit subsequently drives a readout device 17 such as an indicating meter. Control over alternate routing of the signal from the amplifier 13 to the respective amplifier circuits 14 and 15 is controlled by an electronic switching circuit 18 which functions in timed relationship to the operation of the source 10 in generating the two discrete beams of radiation. For example, the mechanisms controlling operation of the filtering mechanism can be utilized to provide a signal to synchronously operate the switching circuit 18. A circuit connection for this switching signal is indicated graphically at 19. In view of the previous detailed disclosures of radiation generation and detection apparatus as in U.S. Pat. 3,089,382, it is believed that the foregoing brief description is adequate for a full disclosure of the interference-eliminating techniques of this invention.

In accordance with the first aspect of the technique of this invention for eliminating interference errors in reflection measurements, the radiation source 10 is provided with an optical beam forming system or lens system 20 which, as shown in FIG. 1, may be interposed in the path of the collimated radiation beams exiting the filter systems or which may be disposed behind the source as in a reflector system (not shown). This lens system 20 is operative to cause dispersion of each beam as illustrated in FIG. 1. Alternatively, beam forming may be effected by the natural dispersion of an unfocused or semifocused beam as it exits the source and would be equivalent to the illustrated lens-type beam-forming system. Radiation components of each beam are thus directed in incident relationship to the surface $C_1$ of the coating in a divergent relationship having the included angle $\alpha$. As a consequence, the radiation beams are caused to be incident to the surface $C_1$ in a broad spectrum of angles of incidence. Lines designated by the symbol $\lambda_A$ and $\lambda_B$ with the respective angles of incidence $\theta_1$ and $\theta_2$ are utilized to diagrammatically define the configuration of the beam of radiation and these incident components are seen to have first and second surface-reflected components which are respectively designated by the subscript symbols $\lambda_{A1}$, $\lambda_{A2}$ and $\lambda_{B2}$. It will be noted from a consideration of FIG. 1 that the reflection of radiation components is diagrammatically illustrated without indicating the effects of refraction that may occur die to different indices of refraction of the coating C and the corresponding ambient medium adjacent the outer surface $C_1$. Ignoring the effect of refraction simplifies the description and refraction does not effect the capability of this technique in eliminating errors due to optical interference. Subsequent reflection of the radiation components results in continued divergence of the radiation components and thus necessitates utilization of a detector or sensor 11 having a relatively broad radiation receptor surface area to accommodate the divergence of the radiation beams. The required area size of a detector is determined by the specific geometrical arrangement such as angle of divergence and linear distance of the radiation path. Broad area detectors having adequate capability are commercially available and a specific structure or arrangement is therefore not further described herein.

Each beam of radiation incident to the specular outer surface $C_1$ of the radiation-transmissive coating C will suffer partial reflection at this first surface and at the interface surface $B_1$ of the coating and sheet B will produce a second surface reflection component comprising at least a portion of the beam not previously reflected at the first surface and transmitted through the coating. This condition will also exist if the base sheet B should not be opaque to the particular wavelength or incident radiation. When considering the two incident radiation lines $\lambda_A$ and $\lambda_B$ delineating the limits of the divergent beam as shown in FIG. 1, it will be seen that each line will produce respective first and second surface-reflected components $\lambda_{A1}$, $\lambda_{B1}$ and $\lambda_{A2}$, $\lambda_{B2}$ which are incident to the radiation receptor surface of the sensor 11 thus defining the minimal area required for the sensor. There will be a consequent phase displacement between the first and second surface-reflected components resulting in interference at the sensor 11 with consequent effect on the output. This interference effect is particularly notable with respect to the radiation beam of a wavelength selected to exhibit resonance absorption as that portion of the beam subject to second surface reflection and subject to absorption provides an indication of the coating parameter of interest but is relatively phase displaced to that part of the beam which is only subjected to first surface reflection and not affected by absorption and thus introduce error in the output indication.

In accordance with the wide-angle technique of this invention for eliminating interference error, the beams of radiation are caused to be divergent by the lens system 20 and the radiation is thus incident to the surface $C_1$ of the coating C in a broad spectrum of angles. This broad spectrum of angles of incidence is illustrated in FIG. 1 as extending from $\theta_1$ to $\theta_2$ for the respective radiation elements $\lambda_A$ and $\lambda_B$ defining the outer envelope of the radiation beam. The phase displacement between the first and second surface reflection components is a function of the angle of incidence and by appropriately selecting a broad spectrum of angles of incidence for the radiation beam, the radiation reflection components are caused to be added at all possible phase angles thereby eliminating the effect of interference error. This wide angle of incidence, in the case where the angle of incidence is of the order of 45° and preferably within the range of 30°–60°, may be approximated by the mathematical expression $$\Delta\theta \gtrsim \frac{\lambda}{d \sin \theta}$$

where $\Delta\theta$ is the difference between the limit angles of incidence $\theta_1$ and $\theta_2$, $\theta$ is the median angle of incidence, $\lambda$ is the wavelength of the radiation and $d$ is the thickness of the coating C. As an example in the case of a polyethylene coating having an approximate thickness of 0.001 inch, this difference in angle of incidence must be of the order of 10° or more to provide the necessary phase displacement to eliminate interference error.

Figure 2:
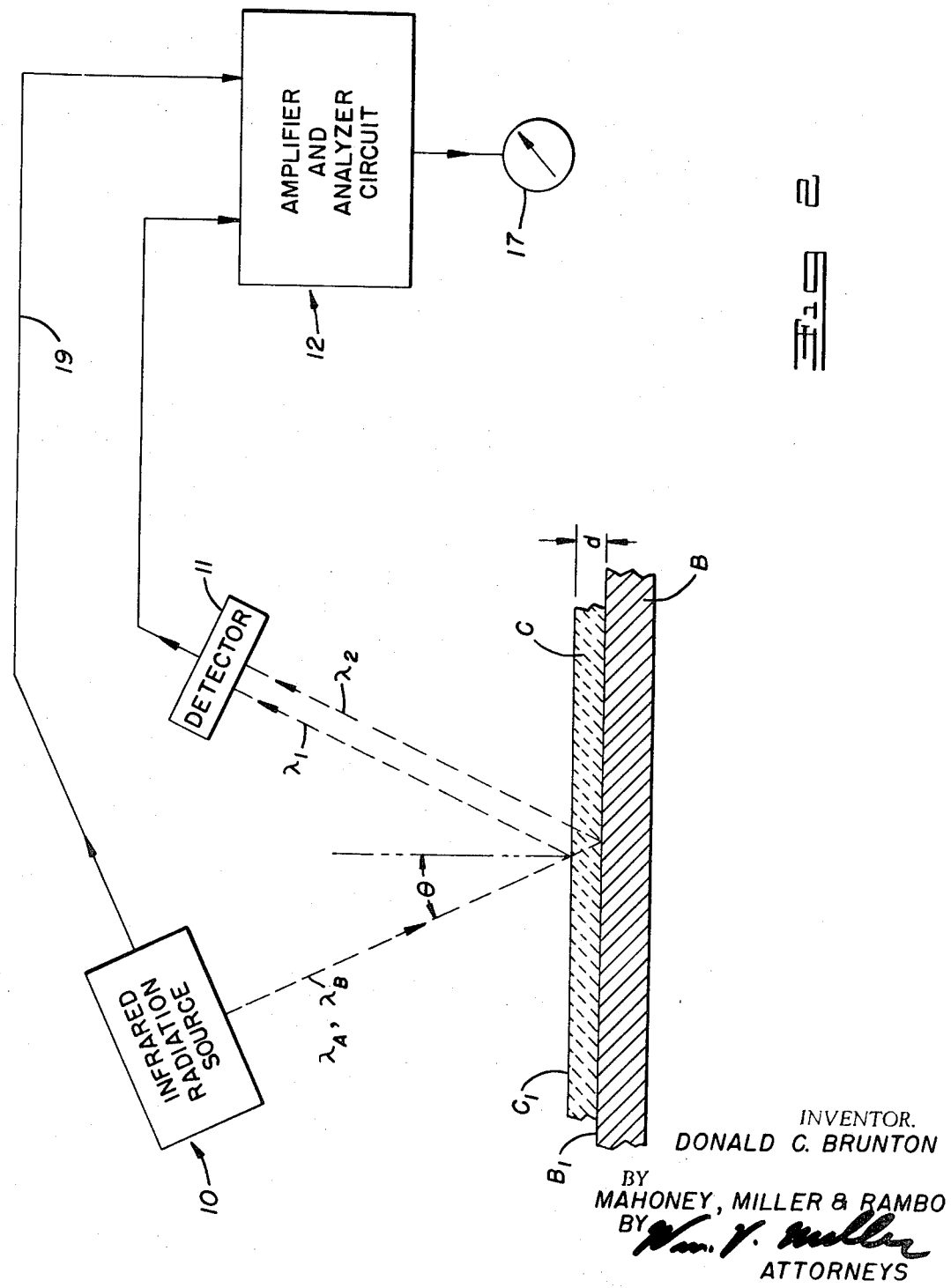
FIG. 2 is a diagrammatic representation of a dual-beam, infrared reflection measurement apparatus which is illustrative of the application of both the closely adjacent reference and absorption wavelength selection and broadband, wavelength spectrum selection techniques for interference error elimination.

In the second aspect of the technique of this invention for eliminating interference errors, the apparatus for producing the dual-beam reflection of infrared radiation relative to the test material is substantially the same as that illustrated and described with respect to FIG. 1 except that the optical beam forming system 20 is omitted. A typical apparatus with the omission of this optical system is diagrammatically illustrated in FIG. 2 where the incident radiation beams $\lambda_A$ and $\lambda_B$, the reference and absorption wavelengths, respectively, are formed of parallel radiation components which may be produced by a conventional collimating lens system as is clearly described in the cited prior art. Another difference with respect to the apparatus shown in FIG. 2, is that the radiation sensor 11 need not be of a broad area detector type as was the case with the apparatus of FIG. 1. In view of a similarity of the apparatus of the two techniques, the similar components and elements of the apparatus in FIG. 2 are identified and designated by the same numerals and letters as FIG. 1.

Each beam of radiation, $\lambda_A$ or $\lambda_B$ is effectively incident to the surface $C_1$ of the coating C at a single angle and will thus produce only the two distinct reflection components identified as the first and second surface components $\lambda_1$ and $\lambda_2$, respectively. In accordance with this aspect of the technique, the two radiation beams are of the wavelengths $\lambda_A$ and $\lambda_B$ specifically selected to be relatively close together within the desired infrared portion of the radiation spectrum while maintaining the absorption and nonabsorption characteristics of the respective radiation beams. The phase displacement of radiation entering the coating C and subsequently reflected at the interface surface $B_1$ is a function of the length of the path of transmission through the material and can be related to the thickness of the coating C which the radiation is transmitted, which, in this instance, is the dimension designated by the letter $d$. By selecting wavelengths which are relatively close together, the effect of the transmission distance on phase displacement may be minimized and the maximum allowable difference may be approximated by a mathematical relationship. The maximum allowable difference between the wavelengths $\lambda_A$ and $\lambda_B$ may be approximated by the mathematical expression $$\frac{\Delta\lambda}{\lambda} \lesssim \frac{\lambda}{30d}$$

wherein $\Delta\lambda$ is the difference in wavelengths for the average wavelength $\lambda$ and $d$ is the thickness of the coating C. As an illustrative example, where the thickness of a coating $d$ is of the order of the wavelengths such as 2.5 microns, it can be determined that the maximum allowable wavelength difference is of the order of $0.08\mu$. This aspect of the interference elimination technique is only effective where the film thickness is relatively small. For example, where the film thickness approaches the order of 0.001 inch, the wavelength difference as determined by the previous formula will decrease to the point where it is not possible to maintain the distinction as to the absorption and nonabsorption characteristics for the selected wavelengths $\lambda_A$ and $\lambda_B$.

This wavelength selection technique for eliminating interference error is effective when utilized alone, but this technique may be advantageously combined with the wide-angle technique previously described with reference to FIG. 1. When thus combined, both the wide-angle and the closely adjacent wavelength selection techniques are effective to enhance elimination of interference error effects in the output indication of the apparatus. The combined effect of the two techniques will be self-evident and is not further described.

A third aspect of the technique of this invention for eliminating interference error effects in reflection measurement utilizes the apparatus previously described in connection with FIG. 2. In this aspect, the two radiation beams are each formed to comprise a relatively broad spectral band having the respective average wavelengths $\lambda_A$ and $\lambda_B$. The phase displacement between the first and second surface reflection components is also a function of the specific wavelength and will be substantially eliminated when reflection components for the radiation beams are added at all phase angles. This is accomplished by selecting a broad spectral band of wavelengths for each beam such that the reflection components will be added at all possible phase angles. The necessary spectral band $\Delta\lambda$ for each specific wavelength may be approximated by the mathematical expression $$\frac{\Delta\lambda}{\lambda} \gtrsim \frac{\lambda}{d}$$

in which $\lambda$ is the average wavelength of the respective radiation beam and $d$ is the thickness of the coating C. Assuming a coating thickness $d$ of 0.001 inch, this mathematical expression will show that the spectral band for an effective wavelength $\lambda$ of $2.5\mu$ should exceed $0.25\mu$.

This third aspect of this technique has been described as effective in substantially eliminating interference errors when utilized alone, but it is also contemplated that this broad spectral band technique may be combined with the wide-angle technique previously described and illustrated with respect to FIG. 1. In that instance, the combination of the effects of both the wide-angle and broad spectral band techniques are self-evident and are not further described.

The techniques of this invention for interference error elimination have been described and illustrated with respect to reflection measurements, but these techniques are equally applicable to through-transmission measurements. Through-transmission measurements may be made on either a self-supporting sheet of the film or a film formed as a coating on a base sheet which is also transmissive of radiation of both the absorption and nonabsorption wavelengths. Apparatus for effecting through-transmission measurements in accordance with the previously described techniques is illustrated in FIG. 3 as applied to a self-supporting film or sheet of the material for simplicity of illustration. The film is again designated by the letter C and is of a thickness $d$ with the opposed surfaces designated by the letters $C_1$ and $B_1$. The apparatus components are the same as in the previously described apparatus with the only difference being that the detector 11 is now positioned at the side of the film C opposite the dual-beam radiation source 10.

The wide-angle technique of interference error elimination is specifically illustrated, but the closely adjacent wavelength selection and broad spectral band techniques are equally applicable, either independently or in combination with the wide-angle technique. In this example, a divergent beam of radiation having the defining limits $\lambda_A$ and $\lambda_B$ is shown as incident to the surface $C_1$ with components being transmitted through and exiting at the opposite surface $B_1$ as components $\lambda_{A1}$, $\lambda_{A2}$ and $\lambda_{B1}$, $\lambda_{B2}$. A portion of each beam component will be internally reflected at the specular surface $B_1$ and subsequently again internally reflected at the specular surface $C_1$ before this portion of the beam will exit the film. Because of this greater distance of transmission in the film, the component $\lambda_{A2}$ will be relatively phase displaced to the component $\lambda_{A1}$ thus producing an interference error. Similarly, component $\lambda_{B2}$ is relatively displaced to component $\lambda_{B1}$, and also produces an interference error. By causing the radiation beam components to be incident at a sufficiently wide angle $\Delta\theta$ which, in the case where the angle of incidence is of the order of 45° and preferably within the range of 30°–60°, may be approximated by the mathematical expression $$\Delta\theta \gtrsim \frac{\lambda}{d \sin \theta}$$

the transmitted beam components are caused to be added at all possible phase angles thereby eliminating interference error.

Selecting the wavelengths of the absorbed and reference wavelengths to be relatively close together as determined from the mathematical expression $$\frac{\Delta\lambda}{\lambda} \lesssim \frac{\lambda}{30d}$$

will also be effective with respect to a through-transmission measurement. This technique can be related to a single beam component ($\lambda_A$) and will be seen to be applicable either independently or in combination with the wide-angle technique. Similarly, the broad spectral band technique where each beam of radiation is designed to comprise a wavelength spectrum determined by the relationship $$\frac{\Delta\lambda}{\lambda} \gtrsim \frac{\lambda}{d}$$

will be seen to be applicable either independently or in combination with the wide-angle technique.

Details of some elements of structure are not incorporated in the foregoing description as these elements are well known in this prior art and the interference error eliminating techniques of this invention are fully disclosed in the specification and drawings. These techniques are equally applicable to either reflection or through-transmission measurements in effectively eliminating interference errors thereby providing more accurate results. Any of the three described techniques may be utilized independently of the others or either the closely adjacent wavelength selection or the broad spectral band techniques may be utilized in combination with the wide-angle technique as may be deemed advisable in a specific application of the invention to optimize interference error elimination.

Having thus described this invention, what is claimed is:

1. A dual-beam infrared reflection or transmission measurement method for determining a parameter of an infrared radiation transmissive film having specular surfaces and comprising the steps of
   A. generating first and second beams of infrared radiation of respective wavelengths $\lambda_1$ and $\lambda_2$ with one of said wavelengths selected to exhibit more absorption with respect to the material forming the film than the other wavelength;
   B. directing each of said beams toward the film to be incident to a first surface of the film at a broad spectrum of angles of incidence resulting in a portion of each beam being reflected at the first surface or transmitted through the film and exiting at a second surface and another portion of each beam being transmitted through the film and reflected at the second surface for transmission through the film to either exit at the first surface or to be reflected at the first surface to exit the film at the second surface such that components of each beam will be added at all possible phase angles;
   C. detecting by a radiation-responsive sensor either those portions of the respective beams reflecting from and exiting at the first surface of the film or those portions of the respective beams exiting at the second surface and forming a signal related to the magnitude of each respective beam of radiation thus detected, and
   D. determining the ratio of the signals for each beam thereby providing an indication of the film parameter.

2. The method of claim 1 where the angles of incidence spectrum is defined by the mathematical expression $$\Delta\theta \gtrsim \frac{\lambda}{d \sin \theta}$$

where $\Delta\theta$ is the angle of incidence spectrum, $\theta$ is the median angle of incidence, $d$ is the thickness of the film and $\lambda$ is the wavelength of the respective beam of radiation.

3. The method of claim 1 wherein the wavelengths $\lambda_1$ and $\lambda_2$ are selected to be relatively close together in the infrared spectrum to obtain a minimum phase displacement between the detected components of each beam.

4. The method of claim 3 wherein the difference between wavelengths $\lambda_1$ and $\lambda_2$ is approximated by the mathematical expression $$\frac{\Delta\lambda}{\lambda} \lesssim \frac{\lambda}{30d}$$

where $\Delta\lambda$ is the wavelength difference and $d$ is the thickness of the film.

5. The method of claim 1 wherein said first and second beams of radiation each comprise relatively broad wavelength spectrums having respective average wavelengths $\lambda_1$ and $\lambda_2$ with the width of each wavelength spectrum being such that detected components are added at all phase angles.

6. The method of claim 5 wherein the width of each wavelength spectrum $\Delta\lambda$ is determined by the mathematical expression $$\frac{\Delta\lambda}{\lambda} \gtrsim \frac{\lambda}{d}$$

in which $\lambda$ is the average wavelength of each spectrum and $d$ is the thickness of the film.

7. A dual-beam infrared reflection or transmission measurement method for determining a parameter of an infrared radiation transmissive film having specular surfaces and comprising the steps of
   A. generating first and second beams of infrared radiation and directing each of the beams toward the film in angularly incident relationship to a first surface of the film resulting in a portion of each beam being reflected at the first surface or being transmitted through the film and exiting at a second surface and another portion of each beam being transmitted through the film and reflected at the second surface for transmission through the film to exit at the first surface or to be reflected at the first surface to exit at the second surface, said beams of radiation comprising respective wavelengths selected to be relatively close together in the infrared spectrum to obtain a minimum phase displacement between respective components of each beam with one of said beams comprising radiation of a wavelength selected to exhibit more absorption with respect to the material forming the film than the other beam,
   B. detecting by a radiation-responsive sensor either those portions of the respective beams reflecting from and exiting at the first surface of the film or those portions of the respective beams exiting at the second surface and forming a signal related to the magnitude of each respective beam of radiation thus detected, and C. determining the ratio of the signals for each beam thereby providing an indication of the film parameter.

8. The method of claim 7 wherein the difference between the beam wavelengths is approximated by the mathematical expression $$\frac{\Delta\lambda}{\lambda} \leq \frac{\lambda}{30d}$$

in which $\Delta\lambda$ is the maximum allowable wavelength difference and $d$ is the thickness of the film.

9. A dual-beam infrared reflection or transmission measurement method for determining a parameter of an infrared radiation transmissive film having specular surfaces and comprising the steps of A. generating first and second beams of infrared radiation and directing each of the beams toward the film in angularly incident relationship to a first surface of the film resulting in a portion of each beam being reflected at the first surface or being transmitted through the film and exiting at a second surface and another portion of each beam being transmitted through the film and reflected at the second surface for transmission through the film to exit at the first surface or to be reflected at the first surface to exit at the second surface, each of said beams of radiation comprising a broad wavelength spectrum such that components of each beam reflecting from or exiting at the first surface or exiting at the second surface will be added at all possible phase angles with one of said beams comprising radiation of wavelengths selected to exhibit more absorption with respect to the material forming the film than other beam, B. detecting by a radiation-responsive sensor either those portions of the respective beams reflecting from and exiting at the first surface of the film or those portions of the respective beams exiting at the second surface and forming a signal related to the magnitude of each respective beam of radiation thus detected, and C. determining the ratio of the signals for each beam thereby providing an indication of the film parameter.

10. The method of claim 9 wherein each beam comprises a wavelength spectrum which is of a minimum width $\Delta\lambda$ determined by the mathematical expression $$\frac{\Delta\lambda}{\lambda} \geq \frac{\lambda}{d}$$

in which $\lambda$ is the average wavelength of the respective wavelength spectrum and $d$ is the thickness of the film.

11. Apparatus for effecting dual-beam, infrared reflection or transmission measurement of a perimeter of a radiation-transmissive film having specular surfaces comprising A. radiation source generating first and second beams of infrared radiation of respective wavelengths $\lambda_1$ and $\lambda_2$ and including means for directing said beams toward the film to be incident to a first surface of the film with one of said wavelengths selected to exhibit more absorption with respect to the material forming the film than the other beam, B. beam-forming means interposed in the path of said beams of radiation to cause said beams of radiation to be divergent and incident to the film at a broad spectrum of angles of incidence such that components of each beam which are reflected from and exit at the first surface of the film or which exit at a second surface of the film will be added at all possible phase angles.

C. a radiation-responsive sensor interposed in the path of the components of the beams of radiation which are either reflected from an exit at the first surface of the film or which exit at the second surface of the film for detection of the radiation and formation of a signal related to each respective beam, and D. means responsive to the signals thus formed for each respective beam and forming an output indicative of a parameter of the film.

12. Apparatus according to claim 11 wherein said beam-forming means causes said radiation to be incident at a spectrum of angles $\Delta\theta$ which is defined by the mathematical expression $$\Delta\theta \geq \frac{\lambda}{d \sin \theta}$$

where $\theta$ is the median angle of incidence, $\lambda$ is the wavelength of the respective beam of radiation and $d$ is the thickness of the film.

13. The apparatus of claim 11 wherein said radiation source is designed to produce radiation beams of wavelengths $\lambda_1$ and $\lambda_2$ selected to be relatively close together to obtain maximum phase displacement between components of the radiation beams, the maximum allowable difference in said wavelengths $\lambda_1$ and $\lambda_2$ approximated by the mathematical expression $$\frac{\Delta\lambda}{\lambda} \leq \frac{\lambda}{30d}$$

in which
$\Delta\lambda$ is the maximum allowable wavelength difference,
$\lambda$ is the respective wavelength and $d$ is the film thickness.

14. The apparatus of claim 11 wherein said radiation source forms radiation beams comprising relatively broad wavelength spectrums such that radiation components are added at all possible phase angles, the minimum allowable width $\Delta\lambda$ of each beam's wavelength spectrum determined by the mathematical expression $$\frac{\Delta\lambda}{\lambda} \geq \frac{\lambda}{d}$$

in which $\lambda$ is the average wavelength of each respective beam and $d$ is the thickness of the film.

15. Apparatus for effecting dual-beam, infrared reflection or transmission measurements of a parameter of a radiation-transmissive film having a specular surfaces comprising A. a radiation source generating first and second beams of infrared radiation of respective wavelengths $\lambda_1$ and $\lambda_2$ and including means for directing said beams toward the film to be incident to a first surface of the film with one of said wavelengths selected to exhibit more absorption with respect to the material forming the film than the other beam, said wavelengths $\lambda_1$ and $\lambda_2$ selected to be relatively close together to obtain a minimum phase displacement between components of each beam which are reflected from and exit at the first surface of the film or which exit at a second surface of the film.

B. a radiation-responsive sensor interposed in the path of the components of the beams of radiation which are either reflected from and exit at the first surface of the film or which exit at the second surface of the film for detection for the radiation and formation of a signal related to each respective beam, and C. means responsive to the signals thus formed for each respective beam and forming an output indicative of a parameter of the film.

16. The apparatus of claim 15 wherein said radiation source forms beams of radiation with the difference between the wavelengths $\Delta\lambda$ approximated by the mathematical expression $$\frac{\Delta\lambda}{\lambda} \leq \frac{\lambda}{30d}$$

which $\lambda$ is a beam wavelength $\lambda_1$ or $\lambda_2$ and $d$ is the thickness of the film.

17. Apparatus for effecting dual-beam, infrared reflection or transmission measurements of a parameter of a radiation-transmissive film having specular surfaces comprising
- A. radiation source generating first and second beams of infrared radiation of respective average wavelengths $\lambda_1$ and $\lambda_2$ and including means for directing said beams toward the film to be incident to a first surface of the film with one of said wavelengths selected to exhibit more absorption with respect to the material from the film than the other beam, said radiation source forming beams of radiation comprising relatively broad wavelength spectrums such that radiation components of each beam which are reflected from and exit the first surfaces of the film or which exit at a second surface of the film are added to all possible phase angles,
- B. a radiation-responsive sensor interposed in the path of the components of the beams of radiation which are either reflected from and exit at the first surface of the film or which exit at the second surface of the film for detection of the radiation and formation of a signal related to each respective beam, and
- C. means responsive to the signals thus formed for each respective beam and forming an output indicative of a parameter of the film.

18. The apparatus of claim 17 wherein said radiation source forms beams of radiation comprising a wavelength spectrum determined by the mathematical expression $$\frac{\Delta\lambda}{\lambda} \geq \frac{\lambda}{d}$$

in which $\lambda$ is the average wavelength of each respective beam and $d$ is the thickness of the film.

* * * * *